United States Patent
Yang et al.

(10) Patent No.: US 10,491,028 B2
(45) Date of Patent: Nov. 26, 2019

(54) WIRELESS POWER TRANSFER WITH GENERALIZED HARMONIC CURRENT

(71) Applicant: Ford Global Technologies, LLC, Dearborn, MI (US)

(72) Inventors: Shuitao Yang, Beaumont, TX (US); Fan Xu, Novi, MI (US); Baoming Ge, Okemos, MI (US); Lihua Chen, Farmington Hills, MI (US); Mohammed Khorshed Alam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 15/934,552

(22) Filed: Mar. 23, 2018

(65) Prior Publication Data

US 2019/0296573 A1    Sep. 26, 2019

(51) Int. Cl.
*H02J 7/00* (2006.01)
*H02J 7/02* (2016.01)
*H02J 50/12* (2016.01)
*B60L 53/20* (2019.01)

(52) U.S. Cl.
CPC .............. *H02J 7/025* (2013.01); *H02J 50/12* (2016.02); *B60L 53/20* (2019.02)

(58) Field of Classification Search
CPC ............ H02J 7/025; H02J 50/12; B60L 53/20

USPC ........................................................ 320/108
See application file for complete search history.

(56) References Cited

U.S. PATENT DOCUMENTS

| | | | |
|---|---|---|---|
| 8,278,784 B2 | 10/2012 | Cook et al. | |
| 8,766,487 B2 | 7/2014 | Baarman et al. | |
| 10,033,222 B1* | 7/2018 | Leabman | H02J 50/40 |
| 2011/0101790 A1* | 5/2011 | Budgett | H02J 50/12 |
| | | | 307/104 |
| 2014/0354065 A1* | 12/2014 | Pomp-Melchers | H02J 7/025 |
| | | | 307/104 |
| 2015/0107333 A1 | 7/2015 | Baarman et al. | |
| 2015/0244177 A1* | 8/2015 | Budgett | H02M 3/3376 |
| | | | 320/108 |
| 2016/0241086 A1* | 8/2016 | Jung | H02J 50/80 |
| 2019/0023141 A1* | 1/2019 | Huang | B60L 11/1833 |

* cited by examiner

*Primary Examiner* — Arun C Williams
(74) *Attorney, Agent, or Firm* — David B. Kelley; Brooks Kushman P.C.

(57) ABSTRACT

A wireless charging arrangement has primary side circuitry including a voltage source, switches, and a primary coil arranged to couple with a secondary coil. The primary side circuitry forms a series resonant converter when transferring power from the primary coil to the secondary coil. The wireless charging arrangement also includes a controller to selectively activate the switches to cause the transferring such that for each fundamental cycle, a pair of consecutive active resonant cycles have same polarity.

15 Claims, 5 Drawing Sheets

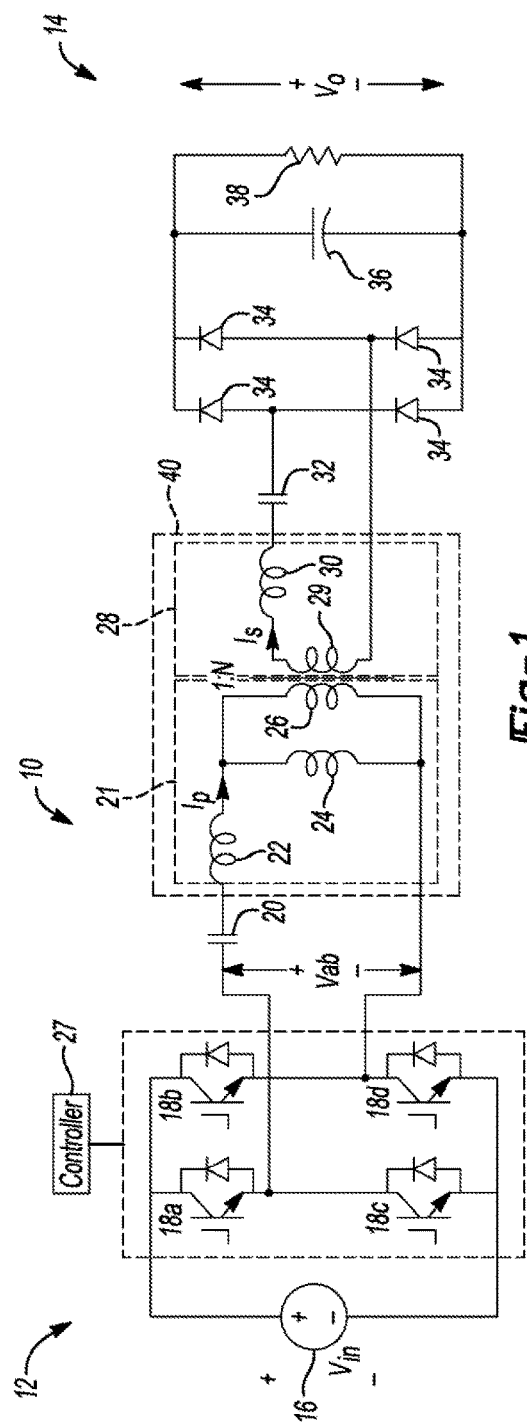
Fig-1
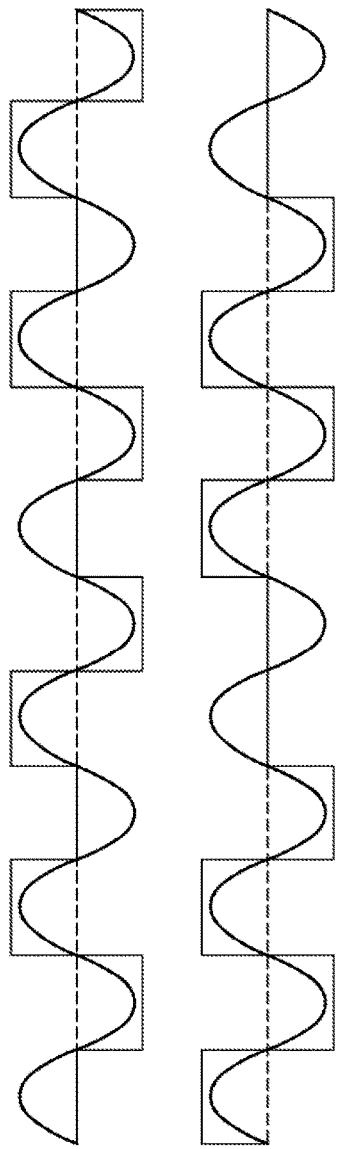
Fig-6A
Fig-6B

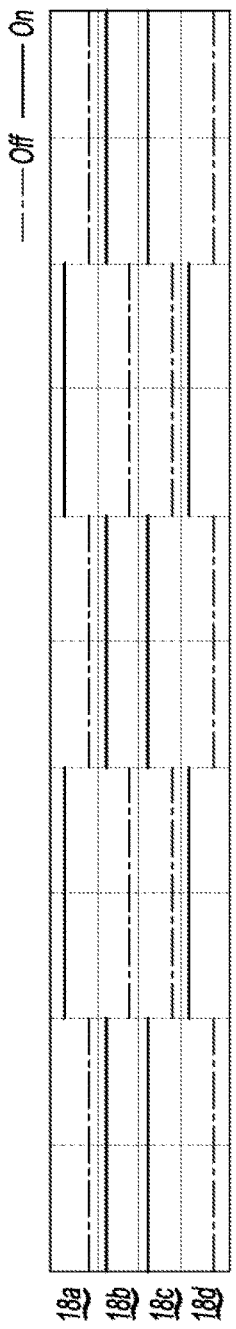
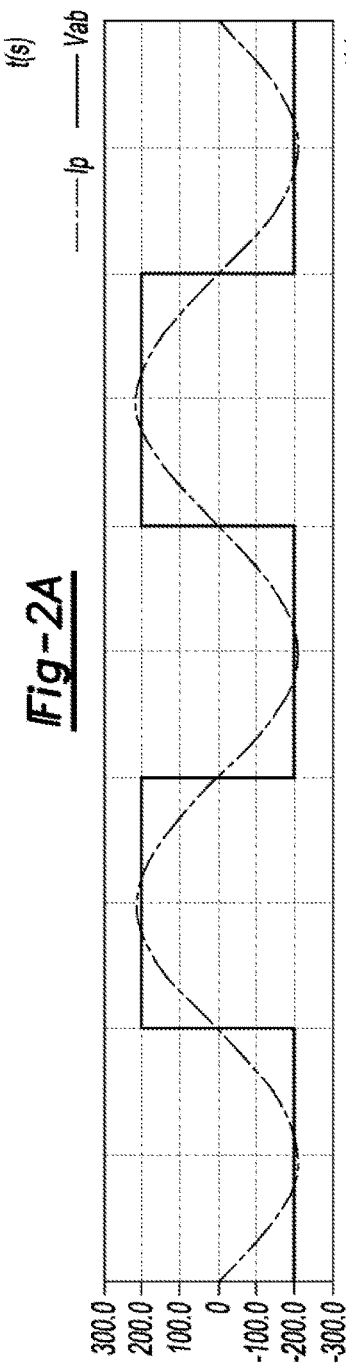
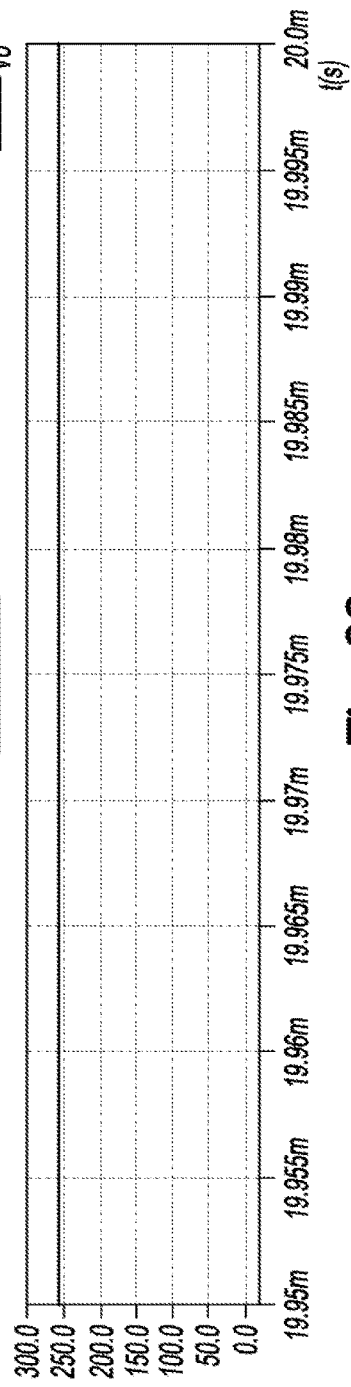
Fig-2A
Fig-2B
Fig-2C

— Vab
— Ip

— Vab
— Ip

——— $V_{ab}$
——— $I_p$

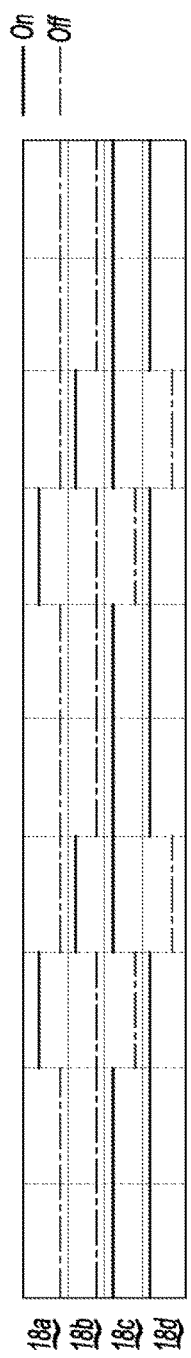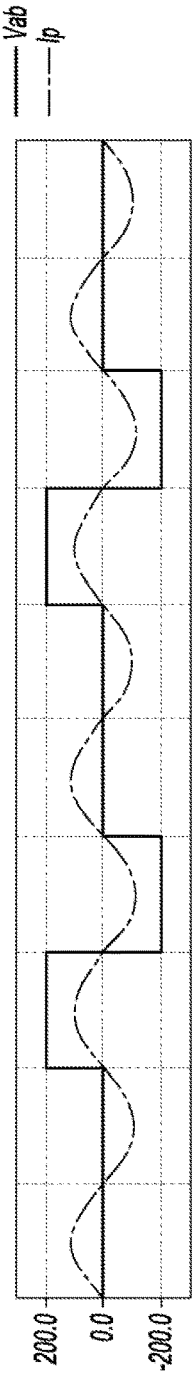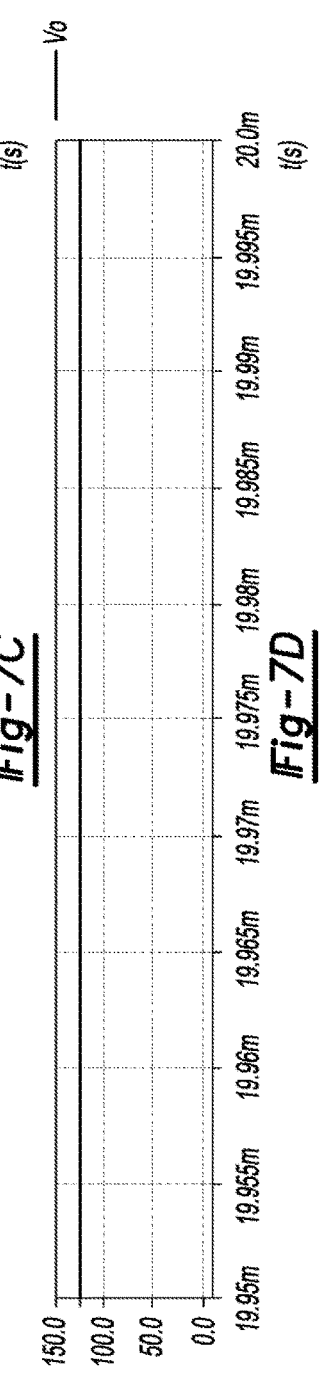
Fig-7A
Fig-7B
Fig-7C
Fig-7D

US 10,491,028 B2

WIRELESS POWER TRANSFER WITH GENERALIZED HARMONIC CURRENT

TECHNICAL FIELD

This disclosure relates to battery charging via wireless power transfer.

BACKGROUND

The increased electrification of automotive vehicles has increased the demand for available charge stations to support the same. Such charge stations may offer plugged (wired) or wireless options.

SUMMARY

A wireless charging arrangement has primary side circuitry including a voltage source, switches, and a primary coil arranged to couple with a secondary coil, and configured to form a series resonant converter when transferring power from the primary coil to the secondary coil. The wireless charging arrangement also includes a controller configured to selectively activate the switches to cause the transferring such that for each fundamental cycle, a pair of consecutive active resonant cycles have same polarity.

A wireless charger has primary side circuitry including switches and a primary coil that is arranged to couple with a secondary coil, and configured to form a series resonant converter when transferring power. The wireless charging arrangement also includes a controller configured to selectively activate the switches to cause the transferring such that for each fundamental cycle, a quotient of a total number or resonant cycles and a total number of active resonant cycles has a non-integer value.

A wireless charger has primary side circuitry including switches and a primary coil that is arranged to couple with a secondary coil, and configured to form a series resonant converter when transferring power. The wireless charger also includes a controller configured to selectively activate the switches to cause the transferring such that for each fundamental cycle, a quotient of a total number or resonant cycles and a total number of active resonant cycles has an integer value greater than one, and the total number of active resonant cycles is greater than one.

BRIEF DESCRIPTION OF THE DRAWINGS

FIG. 1 is a schematic diagram of a wireless power transfer system.

FIG. 2a is a plot of activation timing for switching elements of FIG. 1.

FIG. 2b is a plot of Vab and Ip of FIG. 1 versus time resulting from operation of the switching elements according to the activation timing of FIG. 2a.

FIG. 2c is a plot of Vo of FIG. 1 versus time resulting from operation of the switching elements according to the activation timing of FIG. 2a.

FIGS. 6a and 6b are plots comparing waveforms of Vab and Ip of FIG. 1 for power transfer via 1.5× generalized harmonic current.

FIG. 7a is another plot of activation timing for the switching elements of FIG. 1.

FIG. 7b is a plot of Vab and Ip of FIG. 1 versus time resulting from operation of the switching elements according to the activation timing of FIG. 7a.

FIG. 7c is a plot of Is of FIG. 1 versus time resulting from operation of the switching elements according to the activation timing of FIG. 7a.

FIG. 7d is a plot of Vo of FIG. 1 versus time resulting from operation of the switching elements according to the activation timing of FIG. 7a.

DETAILED DESCRIPTION

Figure 3A:
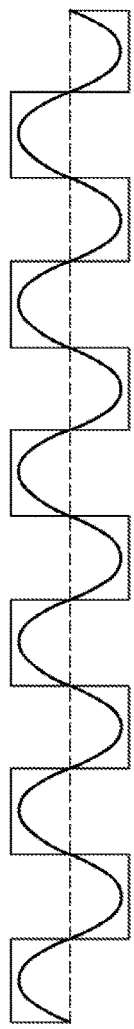
FIG. 3a is a plot comparing waveforms of Vab and Ip of FIG. 1 for power transfer via fundamental current.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Wireless power transfer is a convenient and possibly autonomous means for electric vehicle (EV) and plug-in hybrid electric vehicle (PHEV) charging. FIG. 1 shows a typical wireless power transfer circuit 10 having a series resonant converter (SRC) architecture. The wireless power transfer circuit 10 includes a primary side 12 and a secondary side 14. The primary side 12 includes a voltage source 16, switching elements 18a-18d, a capacitor 20, and a primary coil 21. The primary coil 21 is represented as a primary side leakage inductance 22, a magnetization inductance 24, and a winding 26. The primary side 12 also includes a controller 27. The voltage source 16 and switching elements 18a-18d are in parallel. The capacitor 20 and primary side leakage inductance 22 are in series. And the magnetization inductance 24 and winding 26 are in parallel. The controller 27 controls operation of the switching elements 18a-18d.

The secondary side 14 includes a secondary coil 28. The secondary coil 28 is represented by a winding 29 and a secondary side leakage inductance 30. The secondary side 14 also includes a capacitor 32, diodes 34 that form a rectifier, a capacitor 36, and a resistor 38. The winding 29, secondary side leakage inductance 30, and capacitor 32 are in series. And the diodes 34, capacitor 36, and resistor 38 are in parallel. As apparent to those of ordinary skill, primary coil 21 and secondary coil 28 form a transformer 40.

FIGS. 2a-2c show typical operation of the wireless power transfer circuit 10. Here, Vin is the voltage of the voltage source 16, Vab is the voltage at the output of the switching elements 18a-18d, Ip is the current of the primary coil 21, and Vo is the voltage across the resistor 38. FIG. 2a details the switching scheme used by the controller 27 to yield the alternating square wave Vab of FIG. 2b and the resulting generally constant output Vo across resistor 38. The controller 27 alternately activates the switching elements 18a, 18d and the switching elements 18b, 18c. That is when the switching elements 18a, 18d are on, the switching elements 18b, 18c are off, and visa-versa. Thus, FIGS. 2a-2c show wireless power transfer via fundamental current.

It may be desirable to operate the wireless power transfer circuit 10 at high resonant frequency to reduce passive component size and cost. For EV/PHEV chargers with higher power level (e.g., several kilo watts), high current IGBTs instead of MOSFETs are usually used as the switching elements 18a-18d, which can only operate up to around 20 kHz. Therefore, the resonant/operating frequency is usually limited by the power device.

Figure 3B:
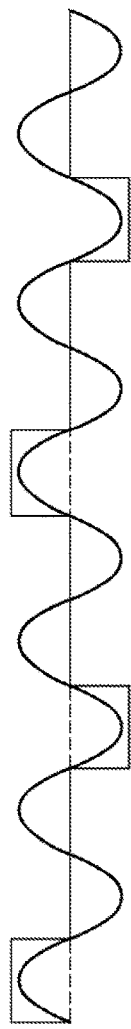
FIGS. 3b and 3c are plots comparing waveforms of Vab and Ip of FIG. 1 for power transfer via $3^{rd}$ and $5^{th}$ order fixed harmonic current, respectively.
Figure 3C:
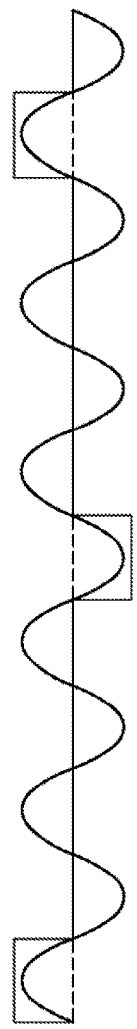

Some have suggested wireless power transfer via odd-order harmonic currents (e.g., 3rd, 5th, 7th, etc.). Compared to power transfer via fundamental current as shown in FIG. 2, the system resonant/operating frequency of this this technique is Q times higher (where Q equals the harmonic order) than the power device switching frequency. Therefore, it features high resonant frequency to reduce passive component size and cost—at the same time, relatively low switching frequency is achieved. In addition, it is possible to implement load regulation and input voltage regulation by selecting different order harmonics while keeping the soft-switching at full operating regions. FIGS. 3a-3c show a comparison of power transfer via fundamental current as compared with power transfer via $3^{rd}$ harmonics current and $5^{th}$ harmonics current.

Due to the harmonic selective feature of SRC circuits, the resonant current frequency will remain the same with different voltage patterns. Thus by re-arranging the positions and number of active resonant cycles that have active voltage output (Vab=+Vdc or −Vdc), we propose additional unexpected ways to implement wireless power transfer with harmonic currents besides the fixed odd-order harmonic current discussed with reference to FIG. 3.

Since the harmonic concept here is different from conventional harmonic concepts, we define the generalized harmonic order, X, as the total number of resonant cycles divided by the total number of active resonant cycles over one fundamental cycle. Again, active resonant cycles mean the resonant cycles that have active voltage output.

Figure 4A:
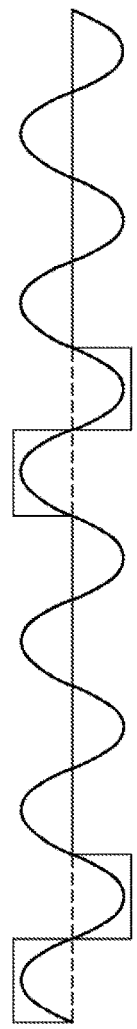
FIGS. 4a and 4b are plots comparing waveforms of Vab and Ip of FIG. 1 for power transfer via 3× generalized harmonic current.
Figure 4B:
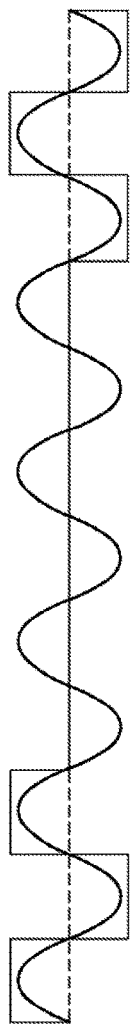

FIGS. 4a and 4b show wireless power transfer with 3× generalized harmonic order with different implementations by re-arranging the positions of active voltage cycles relative to fixed-odd order harmonic implementations. In FIG. 4a, one fundamental cycle consists of six resonant cycles and two active resonant cycles of opposite polarity. The active resonant cycles are adjacent one another. In FIG. 4b, one fundamental cycle consists of eighteen resonant cycles and six active resonant cycles: two groups of three. In each of the groups, the active resonant cycles are again adjacent one another but need not be. All such implementations have the same power delivery and same output voltage.

Similarly, by re-arranging the positions and number of active voltage cycles, different generalized harmonic orders are possible. Any NX generalized harmonic order, where N is greater than or equal to 1 is possible. The smaller the value of N the more active voltage states are used for power transfer, which leads to more transferred power, less circulating current, and higher efficiency. The contemplated generalized harmonic orders provide more flexibility, which can be used for load regulation and voltage regulation while keeping soft-switching in the full operating regions.

Figure 5A:
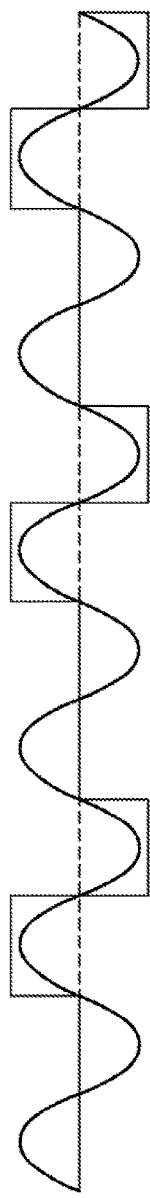
FIGS. 5a through 5e are plots comparing waveforms of Vab and Ip of FIG. 1 for power transfer via 2× generalized harmonic current.
Figure 5B:
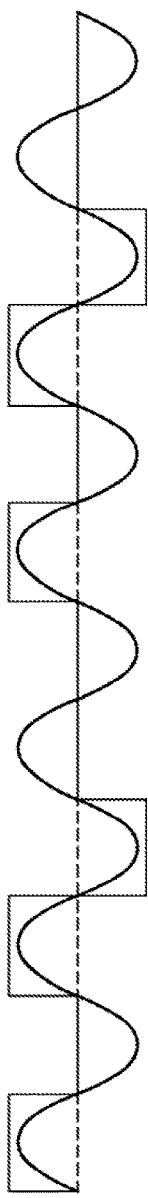
Figure 5C:
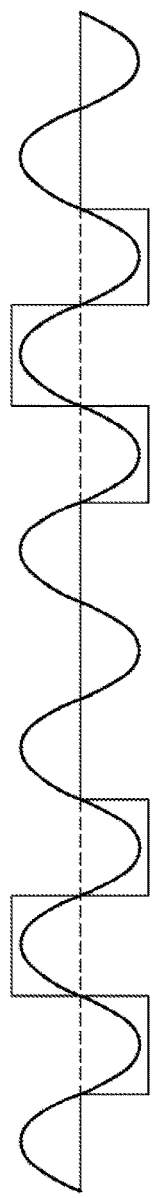
Figure 5D:
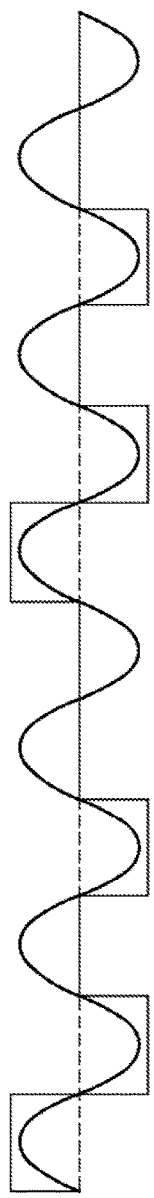
Figure 5E:
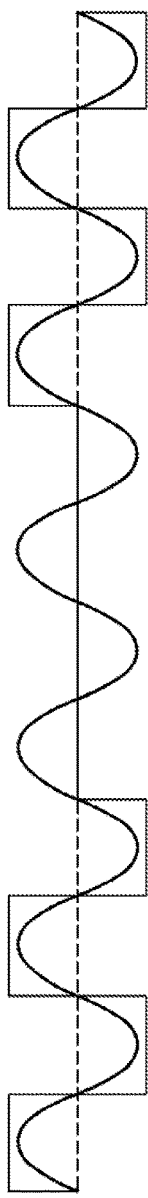

FIGS. 5a-5e show wireless power transfer with 2× generalized harmonic order with different implementations by re-arranging the positions of active voltage cycles relative to fixed-odd order harmonic implementations. In FIG. 5a, one fundamental cycle consists of four resonant cycles and two active resonant cycles of opposite polarity. The active resonant cycles are adjacent one another. In FIG. 5b, one fundamental cycle consists of six resonant cycles and 3 active resonant cycles. Two of the three active resonant cycles are adjacent one another and have opposite polarity. In Figure 5c, one fundamental cycle consists of six resonant cycles and 3 active resonant cycles. The three active resonant cycles are adjacent one another and have alternating polarity. In FIG. 5d, one fundamental cycle consists of six resonant cycles and 3 active resonant cycles. Similar to FIG. 5b, two of the three active resonant cycles are adjacent one another and have opposite polarity. Unlike FIG. 5b however, the adjacent opposite polarity active resonant cycles occur before the $3^{rd}$ active resonant cycle. The three active resonant cycles are adjacent one another and have alternating polarity. In FIG. 5e, one fundamental cycle consists of eight resonant cycles and 4 active resonant cycles. The active resonant cycles are adjacent one another and have alternating polarity. All such implementations have the same power delivery and same output voltage. Compared with the results of the fundamental current of FIG. 2b, less power is transferred to the secondary side 14, leading to a lower Vo.

FIGS. 6a and 6b show wireless power transfer with 1.5× generalized harmonic order with different implementations by re-arranging the positions of active voltage cycles relative to fixed-odd order harmonic implementations. In FIG. 6a, one fundamental cycle consists of six resonant cycles and four active resonant cycles. The active resonant cycles are in adjacent pairs of two having opposite polarity. In FIG. 6b, one fundamental cycle consists of six resonant cycles and 4 active resonant cycles. The active resonant cycles are adjacent one another and have alternating polarity. All such implementations have the same power delivery and same output voltage.

It is worth noting that, unlike fundamental order and fixed-odd order harmonic power transfer, certain implementations have consecutive active resonant cycles of the same polarity. The first two active resonant cycles of FIG. 5b, for example, are of the same polarity. The same is true of the second and third active resonant cycles of FIG. 6a.

FIGS. 7a-7d show operation of the wireless power transfer circuit 10 to produce the 2× generalized harmonic order of FIG. 5a. Again, Vin is the voltage of the voltage source 16, Vab is the voltage at the output of the switching elements 18a-18d, Ip is the current of the primary coil 21, and Vo is the voltage across the resistor 38. Also, Is is the current of the secondary coil 28. FIG. 7a details the switching scheme used by the controller 27 to yield the novel square wave Vab of FIG. 7b, the alternating current Is of FIG. 7c, and the resulting generally constant output Vo across resistor 38 of FIG. 7d.

During the first and second quarters of one fundamental cycle, the controller 27 commands the switching elements 18a, 18b off and the switching elements 18c, 18d on. During the third quarter, the controller 27 commands the switching element 18a on, the switching element 18c off, and leaves the switching elements 18b, 18d in the current state. During the fourth quarter, the controller 27 commands the switching elements 18a, 18d off and commands the switching elements 18b, 18c on. Similar switching schemes for wireless power transfer via the generalized harmonic orders contemplated herein are apparent from the example above.

Conventional frequency modulation for SRC architectures may sacrifice soft-switching to implement load regulation or input voltage regulation. With wireless power transfer via the generalized harmonic orders here however, load regulation and input voltage regulation are implemented by selecting the appropriate harmonic, while maintaining soft-switching. As a result, the SRC switching loss is almost zero in the full operating regions.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. The SRC architecture of FIG. 1, for example, may take various forms depending on operational and packaging requirements. Within the context of vehicle charging, the primary side 12 and controller 27 may form part of a charging station. And the secondary side 14 may be carried by a vehicle. Also as alluded to before, the generalized harmonic orders of FIGS. 4a-6b are not exhaustive. 2.5× generalized harmonic orders, for example, are possible. Such orders could have a fundamental cycle of 10 resonant cycles and 4 active resonant cycles. Others are also contemplated, etc.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A wireless charging arrangement comprising:
   primary side circuitry, including a voltage source, switches, and a primary coil arranged to couple with a secondary coil, configured to form a series resonant converter when transferring power from the primary coil to the secondary coil; and
   a controller configured to selectively activate the switches to cause the transferring such that for each fundamental cycle, a pair of consecutive active resonant cycles have same polarity.

2. The wireless charging arrangement of claim 1, wherein the controller is further configured to activate the switches to cause the transferring such that during each of the fundamental cycles, a quotient of a total number or resonant cycles and a total number of active resonant cycles has a non-integer value.

3. The wireless charging arrangement of claim 1, wherein the controller is further configured to activate the switches to cause the transferring such that during each of the fundamental cycles, another pair of consecutive active resonant cycles have opposite polarity.

4. The wireless charging arrangement of claim 3, wherein the controller is further configured to activate the switches to cause the transferring such that during each of the fundamental cycles, the another pair of consecutive active resonant cycles are adjacent one another.

5. The wireless charging arrangement of claim 1, wherein the controller is further configured to activate the switches to cause the transferring such that during each of the fundamental cycles, the pair of consecutive active resonant cycles are adjacent one another.

6. A wireless charger comprising:
   primary side circuitry, including switches and a primary coil that is arranged to couple with a secondary coil, configured to form a series resonant converter when transferring power; and
   a controller configured to selectively activate the switches to cause the transferring such that for each fundamental cycle, a quotient of a total number or resonant cycles and a total number of active resonant cycles has a non-integer value.

7. The wireless charger of claim 6, wherein the controller is further configured to activate the switches to cause the transferring such that during each of the fundamental cycles, a pair of consecutive active resonant cycles have same polarity.

8. The wireless charger of claim 7, wherein the controller is further configured to activate the switches to cause the transferring such that during each of the fundamental cycles, the pair of consecutive active resonant cycles are adjacent one another.

9. The wireless charger of claim 6, wherein the controller is further configured to activate the switches to cause the transferring such that during each of the fundamental cycles, a pair of consecutive active resonant cycles have opposite polarity.

10. The wireless charger of claim 9, wherein the controller is further configured to activate the switches to cause the transferring such that during each of the fundamental cycles, the pair of consecutive active resonant cycles are adjacent one another.

11. A wireless charger comprising:
    primary side circuitry, including switches and a primary coil that is arranged to couple with a secondary coil, configured to form a series resonant converter when transferring power; and
    a controller configured to selectively activate the switches to cause the transferring such that for each fundamental cycle, a quotient of a total number or resonant cycles and a total number of active resonant cycles has an integer value greater than one, and the total number of active resonant cycles is greater than one.

12. The wireless charger of claim 11, wherein the controller is further configured to activate the switches to cause the transferring such that during each of the fundamental cycles, a pair of consecutive active resonant cycles have same polarity.

13. The wireless charger of claim 12, wherein the controller is further configured to activate the switches to cause the transferring such that during each of the fundamental cycles, the pair of consecutive active resonant cycles are adjacent one another.

14. The wireless charger of claim 11, wherein the controller is further configured to activate the switches to cause the transferring such that during each of the fundamental cycles, a pair of consecutive active resonant cycles have opposite polarity.

15. The wireless charger of claim 14, wherein the controller is further configured to activate the switches to cause the transferring such that during each of the fundamental cycles, the pair of consecutive active resonant cycles are adjacent one another.

* * * * *